March 20, 1951     S. L. BURGWIN     2,545,989
ELECTRONIC CONTROL
Filed Sept. 7, 1945
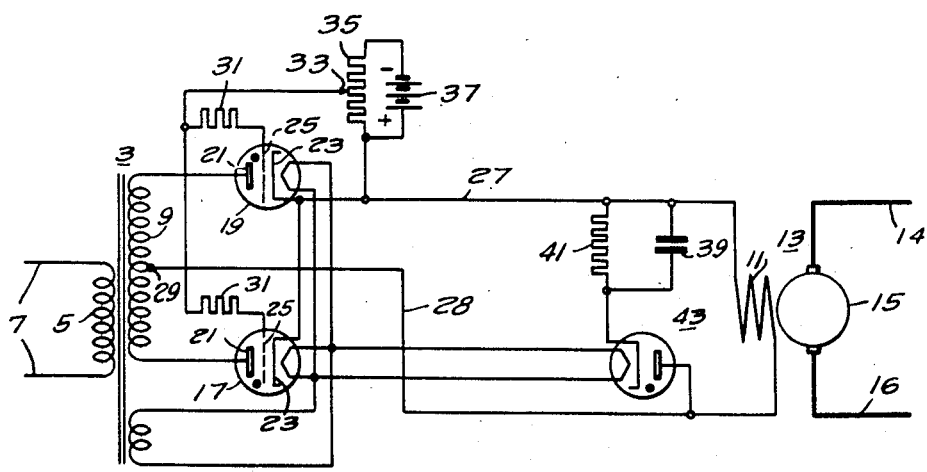
WITNESSES:
E. A. M'Closkey
John R. Shipman
INVENTOR
Stephen L. Burgwin
BY
F. W. Lyle
ATTORNEY Patented Mar. 20, 1951

2,545,989

UNITED STATES PATENT OFFICE 2,545,989

ELECTRONIC CONTROL

Stephen L. Burgwin, Forest Hills, Pa., assignor to Westinghouse Electric Corporation, East Pittsburgh, Pa., a corporation of Pennsylvania Application September 7, 1945, Serial No. 614,945

2 Claims. (Cl. 318—356)

This invention relates to electronic control apparatus and has particular relation to a control for use in supplying energy from an alternating voltage source to the field of a direct current motor.

In control apparatus constructed in accordance with the teachings of the prior art, the field winding of a direct current motor is sometimes energized from an alternating current source through electric valve means of the arc-like type, such as thyratrons or ignitrons. The valve means is connected to act as a rectifier and supply pulsating unidirectional current through the field winding. The average voltage applied to the field winding may be controlled by varying the instant in a half period of the alternating voltage at which the valve means become conductive, hereinafter designated as the ignition point. In this manner the field strength of the motor may be accurately controlled to control the speed of the armature. Thus when it is desired to slow down the motor, the ignition point is suddenly advanced causing a rapid advance in the average voltage to force an increase in the field and a decrease in speed.

When it is desired to use such field control for accurate regulation of the speed, however, it has been found that the maximum rate of increase of the speed of the motor is too small for satisfactory operation. Thus, when the ignition point in a half period is delayed, the field is weakened to effect an increase in speed of the motor but the action is too slow for effective regulation.

It is, accordingly, an object of my invention to provide a new and improved control system for supplying a speed controlling field winding of an electric drive with pulsating unidirectional current.

Another object of my invention is to provide a new and improved control system for regulating the field of a direct current motor in which the field winding is energized with pulsating unidirectional current.

Still another object of my invention is to provide a new and improved control system for supplying an inductive load with pulsating unidirectional current derived from an alternating voltage source in which a rapid rate of change of current through the load is provided in response to changes in the average voltage applied thereto.

My invention arises from the realization that the difficulty in effecting a rapid weakening of the field necessary for a rapid increase in armature speed in the prior apparatus, as described, is attributable to the magnetic energy stored in the field. With the voltage applied to the field being derived from an alternating voltage through valve means of the arc-like type, a pulsating unidirectional voltage is applied. When the ignition point of the valve means is delayed, the pulses of applied voltage are spaced apart. However, when the applied voltage drops to zero at the end of a half period of the supply voltage, the magnetic energy previously stored in the field generates a voltage tending to maintain the current at its previous level. This generated voltage appears across the field winding and is of opposite polarity to the voltage applied thereacross from the supply source but, of course, tends to produce current flowing in the same direction. As a result, the valve means continues to conduct current until the stored energy is substantially dissipated. Since the supply circuit through the valve means has a very low impedance, the stored energy is not dissipated rapidly. Consequently, while a rapid decrease in armature speed may be attained by rapidly advancing the ignition point of the valve means to rapidly increase the average applied voltage, a delaying of the ignition point does not effect a rapid increase in armature speed because the mere removal of applied voltage does not effect a rapid decrease in current through the field winding.

In accordance with my invention I have provided a parallel circuit across the field winding including a capacitor and a shunt resistor in series with an auxiliary valve which is effective at the end of a half period to render the main valve means non-conductive and to dissipate rapidly the magnetic energy previously stored in the field when there is an appreciable interval between the end of a half period and the next ignition point. This results in a rapid increase in armature speed when the ignition point is further delayed.

The features of my invention which I consider novel are set forth with more particularity in the appended claims. The invention itself, however, together with additional objects and advantages thereof may be better understood from the following description of specific embodiments thereof when read in connection with the accompanying drawings, showing a schematic diagram of an embodiment of my invention.

As shown, a transformer 3 has a primary winding 5 energized from alternating current supply lines 7. The secondary winding 9 of the transformer 3 is arranged to supply current through the field winding 11 of a direct current motor 13, the armature 15 of which is energized from a suitable unidirectional voltage source through leads 14 and 16.

A pair of electric discharge valves 17 and 19 of the arc-like type, preferably thyratrons, are each provided with an anode 21, a cathode 23 and a control grid 25. The anodes 21 of the valves 17 and 19 are connected to opposite ends, respectively, of the secondary winding 9. The cathodes 23 of the valves 17 and 19 are connected together and through a conductor 27 to one end of the field winding 11, the other end of which is connected through conductor 28 to an intermediate tap 29 on the secondary winding 9. The control grids 25 of valves 17 and 19 are connected through individual grid resistors 31 to an adjustable tap 33 on a potentiometer 35 which has a direct current voltage thereacross derived from a source such as a battery 37. The positive terminal of the potentiometer 35 is connected to the cathodes 23 of the valves 17 and 19.

It is apparent that a selected biasing voltage is applied between the control grid 25 and cathode 23 of each of the valves 17 and 19 by potentiometer 35. These valves 17 and 19 are connected to become conductive alternately in successive half periods of opposite polarity of the alternating voltage. The instant in a half period at which a valve becomes conductive, i. e. the ignition point, is determined by the magnitude of the biasing voltage. Current then flows from the secondary winding 9 through the valves 17 and 19, alternately, conductor 27, field winding 11 and conductor 28 to the intermediate tap 29. Thus, pulsating unidirectional current is supplied through the field winding 11 and the average magnitude of that current depends upon the ignition points of the valves 17 and 19. Consequently, the field may be strengthened, that is, the flux thereof increased, by adjusting the tap 33 on potentiometer 35 to advance the ignition points of valves 17 and 19 whereby they become conductive earlier in a half period. Similarly, the field may be weakened, that is, the flux thereof decreased, by adjusting the tap 33 on potentiometer 35 to delay the ignition points of the valves 17 and 19 whereby they become conductive at an instant later in a half period.

While I have shown an arrangement for delaying or advancing the ignition points of the valves 17 and 19 by changing a direct current biasing voltage between the control grid and cathode of the valves, the arrangement is only illustrative and any of the other well known arrangements for varying the ignition points may be employed. By many of these known arrangements the ignition points may be varied over substantially a complete half period.

To provide a rapid increase in the field winding current effecting a decrease in the speed, the voltage across the secondary winding 9 of the transformer 3 is arranged to be several times greater than the normal voltage to be applied to the field winding 11. Consequently, in supplying field winding current for rated armature speeds, the valves 17 and 19 are not rendered conductive at the beginning of each corresponding half period of alternating voltage, but their ignition points are delayed somewhat so that the desired lower average field voltage is applied. Then, when it is desired to decrease the armature speed, the ignition points of the valves is advanced to effect a rapid increase in the field winding current by rapidly increasing the average voltage applied to the field winding.

To provide for a rapid increase in armature speed, a capacitor 39 is connected in series with an auxiliary diode rectifier valve 43 across the field winding 11, and a resistor 41 is connected across the capacitor 39. Now, as previously indicated the inductive reactance of the field generates a voltage across the field winding 11 at the end of each half period which is opposite in polarity to the voltage applied thereto from the secondary winding 9 but which tends to produce current flowing in the same direction. If the shunt circuit of capacitor 39, resistor 41 and valve 43 were not in the circuit, the voltage generated across the field 11 would maintain current flow through the particular one of valves 17 and 19 which was conductive, for some time after the voltage supplied from the secondary winding 9 to the anode-cathode of the valve has become negative providing the ignition point of the other valve is considerably delayed. Because of the low impedance in this circuit, the current would continue to flow, if the other valve remains non-conductive, until the magnetic energy previously stored in the field is completely dissipated. As a result, the current through the field 11 would decrease rather slowly in spite of the fact that the ignition points of valves 17 and 19 has been further delayed.

With capacitor 39, resistor 41 and valve 43 in the circuit, however, the action is quite different. The capacitor 39 has a rather low capacity. The capacitor 39 is not charged by the voltage applied to the field winding because of the rectifier characteristics of the auxiliary valve 43. Toward the end of each half period of the alternating voltage, the stored energy in the field again generates a voltage tending to maintain current flow through the field winding. The polarity of this voltage is such that the auxiliary valve 43 becomes conductive. As the capacitor 39 is in a discharged state, the immediate voltage across the field winding 11 is then limited to the arc drop of the auxiliary valve 43. This drop is sufficiently small that the conductive one of valves 17 and 19 becomes non-conductive. Following the rapid discharge of the capacitor 39, the capacitor is rapidly charged in the opposite direction by the voltage generated by the magnetic energy previously stored in the field. When the capacitor becomes fully charged, the generated voltage across the field winding rises rapidly since the valves 17 and 19 are non-conductive. This voltage is equivalent to the application of a negative voltage across the field winding and causes a rapid decrease in the strength in the field. The magnitude of this voltage is determined by the value of the shunt resistor 41 and may be made several times the normal field voltage. Thus, the previously stored magnetic energy is dissipated and the field strength is rapidly decreased. As soon as the energy previously stored in the field is completely dissipated or the next one of valves 17 and 19 becomes conductive, whichever occurs first, the auxiliary valve 43 becomes non-conductive. The capacitor 39 is then discharged through the shunt resistor.

The auxiliary valve 43 prevents oscillation of current between the capacitor 39 and the field winding 11 and reduces the duty on the resistor 41 during the interval in which the voltage applied to the field is increased to effect a decrease in speed. The auxiliary valve 43 is connected to conduct current only in a direction from conductor 28 toward conductor 27. The capacity of the capacitor 39 should be chosen just large enough to extinguish the valves 17 and 19 and the resistance of the shunt resistor 41 should be chosen to prevent the voltage across the field winding from rising to a dangerous magnitude.

Although I have shown my invention as applied to regulation of the field of a direct current motor, it will be understood that it may be used in regulating the field of a direct current generator as well, or in the supply of current to any inductive load. Excellent results have been obtained in a circuit actually constructed in accordance with Fig. 2 in which the field winding of a 50 horsepower direct current motor was energized from an alternating voltage source with the capacitor 39 having a capacity of 10 mfds. and the resistor 41 had a resistance of 400 ohms.

While I have shown and described specific embodiments of my invention, I am aware that many other modifications thereof may be made without departing from the spirit of the invention. I, therefore, do not intend to be limited to the specific embodiments disclosed.

I claim as my invention:

1. Apparatus for controlling the speed of a rotary electric machine having a field winding to be energized from an alternating voltage supply source, comprising electric valve means of the arc-like type connected in circuit with said field winding and source to supply unidirectional current from said source through said field winding, control means connected to said valve means to vary the instant in a half-period of the supply voltage at which the valve means becomes conductive and thereby vary the speed of the machine, an energy storage device, circuit means including a rectifier connecting said storage device in parallel circuit relation with the field winding, the rectifier being effective to conduct current only in a direction opposite to that which tends to flow by application of the supply voltage to supply the storage device with energy previously stored in the field winding upon a predetermined reduction in the applied field winding voltage to cause the valve means to become non-conductive, and impedance means connected in shunt with said storage device to limit the maximum voltage across said field winding while the valve means is non-conductive and to provide a path for dissipation of energy in said storage device.

2. Apparatus for controlling the speed of an electric drive having a field winding to be energized from an alternating voltage supply source, comprising controllable electric valve means of the arc-like type in circuit with said winding and connected to supply controllable unidirectional current from the source through said winding, an energy storage capacitor, circuit means including a half-wave rectifier connecting said capacitor in parallel circuit relation with said winding, the rectifier being effective to conduct current only in a direction opposite to that which tends to flow by application of the supply voltage to supply said capacitor with energy previously stored in said winding upon a predetermined reduction in the voltage applied to said winding to cause the valve means to become non-conductive, and a resistor connected in series with said rectifier and across said capacitor to limit the maximum voltage across said winding while the valve means is non-conductive and to provide a path for dissipation of energy in said capacitor.

STEPHEN L. BURGWIN.

REFERENCES CITED

The following references are of record in the file of this patent:

UNITED STATES PATENTS

| Number | Name | Date |
| --- | --- | --- |
| 1,251,377 | Hull | Dec. 25, 1917 |
| 1,725,709 | Geiger | Aug. 20, 1929 |
| 1,910,202 | Crago | May 23, 1933 |
| 1,928,812 | Dawson | Oct. 3, 1933 |
| 1,966,077 | Nyman | July 10, 1934 |
| 2,011,395 | Cain | Aug. 13, 1935 |
| 2,113,220 | Power | Apr. 5, 1938 |
| 2,282,998 | Edwards | May 12, 1942 |
| 2,421,632 | Livingston | June 3, 1947 |